US008538892B2

(12) United States Patent
Humpleman et al.

(10) Patent No.: US 8,538,892 B2
(45) Date of Patent: *Sep. 17, 2013

(54) METHOD AND SYSTEM FOR ELECTRONIC PURCHASES USING AN INTELLIGENT DATA CARRIER MEDIUM, ELECTRONIC COUPON SYSTEM, AND INTERACTIVE TV INFRASTRUCTURE

(75) Inventors: Richard Humpleman, Fremont, CA (US); Dan Watson, Dublin, CA (US); Manu Mehta, Fremont, CA (US)

(73) Assignee: Thomson Licenging, Boulogne-Billancourt (FR)

( * ) Notice: Subject to any disclaimer, the term of this patent is extended or adjusted under 35 U.S.C. 154(b) by 72 days.

This patent is subject to a terminal disclaimer.

(21) Appl. No.: 11/369,371

(22) Filed: Mar. 6, 2006

(65) Prior Publication Data
US 2006/0179006 A1 Aug. 10, 2006

Related U.S. Application Data

(62) Division of application No. 10/177,236, filed on Jun. 21, 2002.

(60) Provisional application No. 60/299,935, filed on Jun. 21, 2001.

(51) Int. Cl.
*G06Q 20/00* (2012.01)

(52) U.S. Cl.
USPC ......... 705/71; 705/64; 705/14.38; 705/14.49; 705/14.52; 705/14.53; 725/23; 709/238

(58) Field of Classification Search
USPC ........... 705/50–79, 14.1, 14.25, 14.49, 14.52, 705/14.53, 14.65; 725/23; 709/238; 370/324
See application file for complete search history.

(56) References Cited

U.S. PATENT DOCUMENTS

| 5,128,752 A | 7/1992 | Von Kohorn |
| 5,223,924 A | 6/1993 | Strubbe |

(Continued)

FOREIGN PATENT DOCUMENTS

| EP | 0705036 | 4/1996 |
| EP | 0774866 | 5/1997 |

(Continued)

OTHER PUBLICATIONS

"Distributed Digital-Ticket Management for Rights Trading System" Proceedings of the 1st ACM conference on Electronic commerce EC '99.*

(Continued)

*Primary Examiner* — Mamon Obeid
(74) *Attorney, Agent, or Firm* — Robert D. Shedd; Vincent E. Duffy; Joel M. Fogelson

(57) ABSTRACT

A method and a system for electronically transacting a purchase between a purchaser and a merchant are disclosed. The method includes storing accrued incentives on an intelligent data carrier medium via interactive television (DTV/STB) equipment and redeeming a discount or a value corresponding to the accrued incentives present on the data carrier medium when a purchase is made. The electronic purchase system using an electronic network contains a purchaser interactive television (DTV/STB) equipment connected to the electronic network, a fixed intelligent data carrier medium connected to the interactive television (DTV/STB) equipment for service authentication and decryption and a detachable intelligent data carrier medium connected to the interactive television (DTV/STB) equipment.

18 Claims, 9 Drawing Sheets

(56) References Cited

U.S. PATENT DOCUMENTS

| | | | |
|---|---|---|---|
| 5,262,875 A | 11/1993 | Mincer et al. | |
| 5,287,181 A * | 2/1994 | Holman | 348/473 |
| 5,324,338 A | 6/1994 | Holmstrom | |
| 5,355,161 A | 10/1994 | Bird et al. | |
| 5,371,551 A | 12/1994 | Logan et al. | |
| 5,410,344 A | 4/1995 | Graves et al. | |
| 5,416,508 A | 5/1995 | Sakuma et al. | |
| 5,446,919 A | 8/1995 | Wilkins | |
| 5,463,565 A | 10/1995 | Cookson et al. | |
| 5,483,278 A | 1/1996 | Strubbe et al. | |
| 5,523,794 A | 6/1996 | Mankovitz et al. | |
| 5,537,157 A | 7/1996 | Washino et al. | |
| 5,559,549 A | 9/1996 | Hendricks | |
| 5,565,909 A | 10/1996 | Thibadeau | |
| 5,579,055 A | 11/1996 | Hamilton et al. | |
| 5,585,865 A | 12/1996 | Amano et al. | |
| 5,600,364 A | 2/1997 | Hendricks et al. | |
| 5,635,989 A | 6/1997 | Rothmuller | |
| 5,636,346 A | 6/1997 | Saxe | |
| 5,652,613 A | 7/1997 | Lazarus et al. | |
| 5,664,046 A | 9/1997 | Abecassis | |
| 5,671,411 A | 9/1997 | Watts et al. | |
| 5,686,954 A | 11/1997 | Yoshinobu et al. | |
| 5,699,473 A | 12/1997 | Kim | |
| 5,701,383 A | 12/1997 | Russo et al. | |
| 5,704,017 A | 12/1997 | Heckerman et al. | |
| 5,717,923 A | 2/1998 | Dedrick | |
| 5,724,091 A | 3/1998 | Freeman et al. | |
| 5,724,521 A | 3/1998 | Dedrick | |
| 5,754,651 A | 5/1998 | Blatter et al. | |
| 5,758,257 A | 5/1998 | Herz et al. | |
| 5,758,259 A | 5/1998 | Lawler | |
| 5,761,371 A | 6/1998 | Ohno et al. | |
| 5,768,785 A | 6/1998 | Pessin | |
| 5,774,170 A | 6/1998 | Hite | |
| 5,778,135 A | 7/1998 | Ottesen et al. | |
| 5,781,228 A | 7/1998 | Sposato | |
| 5,790,935 A | 8/1998 | Payton | |
| 5,794,210 A | 8/1998 | Goldhaber et al. | |
| 5,798,785 A | 8/1998 | Hendricks et al. | |
| 5,801,747 A | 9/1998 | Bedard | |
| 5,806,045 A | 9/1998 | Biorge et al. | |
| 5,809,471 A | 9/1998 | Brodsky | |
| 5,818,441 A | 10/1998 | Throckmorton et al. | |
| 5,835,087 A | 11/1998 | Herz et al. | |
| 5,848,396 A | 12/1998 | Gerace | |
| 5,867,226 A | 2/1999 | Wehmeyer et al. | |
| 5,878,141 A * | 3/1999 | Daly et al. | 705/78 |
| 5,898,456 A | 4/1999 | Wahl | |
| 5,907,350 A * | 5/1999 | Nemirofsky | 725/23 |
| 5,945,988 A | 8/1999 | Williams et al. | |
| 5,953,073 A | 9/1999 | Kozina et al. | |
| 5,977,964 A | 11/1999 | Williams et al. | |
| 5,990,927 A | 11/1999 | Hendricks et al. | |
| 6,002,393 A | 12/1999 | Hite | |
| 6,005,561 A | 12/1999 | Hawkins et al. | |
| 6,005,597 A | 12/1999 | Barrett et al. | |
| 6,018,612 A | 1/2000 | Thomason et al. | |
| 6,020,883 A | 2/2000 | Herz et al. | |
| 6,029,045 A | 2/2000 | Picco et al. | |
| 6,029,195 A | 2/2000 | Herz | |
| 6,038,612 A | 3/2000 | Liow | |
| 6,057,872 A | 5/2000 | Candelore | |
| 6,075,971 A | 6/2000 | Williams | |
| 6,088,722 A | 7/2000 | Herz et al. | |
| 6,091,883 A | 7/2000 | Artigalas et al. | |
| 6,101,529 A | 8/2000 | Chrabaszcz | |
| 6,105,862 A | 8/2000 | Pailles et al. | |
| 6,128,009 A | 10/2000 | Ohkura et al. | |
| 6,134,532 A | 10/2000 | Lazarus et al. | |
| 6,141,010 A | 10/2000 | Hoyle | |
| 6,157,772 A | 12/2000 | Kim | |
| 6,160,570 A | 12/2000 | Sitnik | |
| 6,169,842 B1 | 1/2001 | Pijnenburg et al. | |
| 6,177,931 B1 | 1/2001 | Alexander et al. | |
| 6,185,360 B1 | 2/2001 | Inoue et al. | |
| 6,209,131 B1 | 3/2001 | Kim et al. | |
| 6,233,389 B1 | 5/2001 | Barton et al. | |
| 6,236,395 B1 | 5/2001 | Sezan et al. | |
| 6,237,145 B1 | 5/2001 | Narasimhan et al. | |
| 6,260,194 B1 | 7/2001 | Shiels et al. | |
| 6,304,714 B1 | 10/2001 | Krause et al. | |
| 6,317,881 B1 | 11/2001 | Shah-Nazaroff et al. | |
| 6,324,334 B1 | 11/2001 | Morioka et al. | |
| 6,324,338 B1 | 11/2001 | Wood | |
| 6,396,500 B1 | 5/2002 | Qureshi et al. | |
| 6,401,242 B1 | 6/2002 | Eyer et al. | |
| 6,446,261 B1 | 9/2002 | Rosser | |
| 6,450,407 B1 * | 9/2002 | Freeman et al. | 235/492 |
| 6,457,010 B1 | 9/2002 | Eldering et al. | |
| 6,463,585 B1 | 10/2002 | Hendricks et al. | |
| 6,466,241 B1 | 10/2002 | Schindler | |
| 6,480,667 B1 | 11/2002 | O'Connor | |
| 6,505,773 B1 * | 1/2003 | Palmer et al. | 235/380 |
| 6,507,950 B1 | 1/2003 | Tsukidate et al. | |
| 6,530,082 B1 | 3/2003 | Del Sesto et al. | |
| 6,536,041 B1 | 3/2003 | Knudson et al. | |
| 6,553,178 B2 | 4/2003 | Abecassis | |
| 6,560,578 B2 | 5/2003 | Eldering | |
| 6,583,825 B1 | 6/2003 | Yuen et al. | |
| 6,587,561 B1 | 7/2003 | Sered et al. | |
| 6,599,473 B1 | 7/2003 | Egger | |
| 6,601,237 B1 | 7/2003 | Ten Kate et al. | |
| 6,607,136 B1 * | 8/2003 | Atsmon et al. | 235/492 |
| 6,614,987 B1 | 9/2003 | Ismail et al. | |
| 6,637,029 B1 | 10/2003 | Maissel et al. | |
| 6,675,384 B1 | 1/2004 | Block et al. | |
| 6,681,396 B1 | 1/2004 | Bates et al. | |
| 6,684,240 B1 | 1/2004 | Goddard | |
| 6,698,020 B1 | 2/2004 | Zigmond et al. | |
| 6,704,930 B1 | 3/2004 | Eldering et al. | |
| 6,704,931 B1 | 3/2004 | Schaffer et al. | |
| 6,738,978 B1 | 5/2004 | Hendricks et al. | |
| 6,799,326 B2 | 9/2004 | Boylan et al. | |
| 6,852,031 B1 | 2/2005 | Rowe | |
| 6,898,762 B2 | 5/2005 | Ellis et al. | |
| 6,915,271 B1 * | 7/2005 | Meyer et al. | 705/14 |
| 6,918,131 B1 | 7/2005 | Rautila et al. | |
| 6,928,653 B1 | 8/2005 | Ellis et al. | |
| 6,950,623 B2 | 9/2005 | Brown et al. | |
| 6,981,040 B1 | 12/2005 | Konig et al. | |
| 6,990,677 B1 | 1/2006 | Pietraszak et al. | |
| 6,993,782 B1 | 1/2006 | Newberry et al. | |
| 7,003,792 B1 | 2/2006 | Yuen | |
| 7,013,286 B1 | 3/2006 | Aggarwal et al. | |
| 7,013,478 B1 | 3/2006 | Hendricks et al. | |
| 7,035,528 B1 | 4/2006 | Britton | |
| 7,039,928 B2 | 5/2006 | Kamada et al. | |
| 7,051,351 B2 | 5/2006 | Goldman et al. | |
| 7,051,352 B1 | 5/2006 | Schaffer | |
| 7,054,900 B1 | 5/2006 | Goldston | |
| 7,086,076 B1 | 8/2006 | Park | |
| 7,096,486 B1 | 8/2006 | Ukai et al. | |
| 7,103,575 B1 * | 9/2006 | Linehan | 705/64 |
| 7,144,627 B2 | 12/2006 | Halas et al. | |
| 7,146,626 B1 | 12/2006 | Arsenault et al. | |
| 7,152,236 B1 | 12/2006 | Wugofski et al. | |
| 7,194,753 B1 | 3/2007 | Fries et al. | |
| 7,370,342 B2 | 5/2008 | Ismail et al. | |
| 7,594,247 B2 | 9/2009 | Arai et al. | |
| 2001/0004733 A1 | 6/2001 | Eldering | |
| 2001/0014870 A1 * | 8/2001 | Saito et al. | 705/14 |
| 2001/0049826 A1 | 12/2001 | Wilf | |
| 2002/0010627 A1 * | 1/2002 | Lerat | 705/14 |
| 2002/0016963 A1 | 2/2002 | Inoue et al. | |
| 2002/0023263 A1 * | 2/2002 | Ahn et al. | 725/32 |
| 2002/0057893 A1 | 5/2002 | Wood et al. | |
| 2002/0073426 A1 | 6/2002 | Bhatt | |
| 2002/0111918 A1 * | 8/2002 | Hoshino et al. | 705/65 |
| 2002/0118954 A1 | 8/2002 | Barton et al. | |
| 2002/0120627 A1 * | 8/2002 | Mankoff | 707/10 |
| 2002/0131768 A1 | 9/2002 | Gammenthaler | |
| 2002/0186296 A1 | 12/2002 | Gogoi et al. | |
| 2002/0199193 A1 | 12/2002 | Gogoi et al. | |

| | | | |
|---|---|---|---|
| 2002/0199194 | A1 | 12/2002 | Ali |
| 2003/0005432 | A1 | 1/2003 | Ellis et al. |
| 2003/0023973 | A1 | 1/2003 | Monson et al. |
| 2003/0028518 | A1* | 2/2003 | Mankoff .......................... 707/1 |
| 2003/0040962 | A1 | 2/2003 | Lewis |
| 2003/0056216 | A1 | 3/2003 | Wugofski et al. |
| 2003/0067554 | A1 | 4/2003 | Klarfeld et al. |
| 2003/0088872 | A1 | 5/2003 | Maissel et al. |
| 2003/0093792 | A1 | 5/2003 | Labeeb et al. |
| 2003/0101451 | A1 | 5/2003 | Bentolila et al. |
| 2003/0101457 | A1 | 5/2003 | Tiemann |
| 2003/0118323 | A1 | 6/2003 | Ismail et al. |
| 2003/0145323 | A1 | 7/2003 | Hendricks et al. |
| 2003/0158818 | A1 | 8/2003 | George et al. |
| 2004/0111742 | A1 | 6/2004 | Hendricks et al. |
| 2004/0117831 | A1 | 6/2004 | Ellis et al. |
| 2004/0128241 | A1 | 7/2004 | Akama |
| 2005/0047752 | A1 | 3/2005 | Wood et al. |
| 2005/0144066 | A1* | 6/2005 | Cope et al. .................. 705/14 |
| 2005/0144641 | A1 | 6/2005 | Lewis |
| 2005/0193410 | A1 | 9/2005 | Eldering |
| 2005/0235318 | A1 | 10/2005 | Grauch et al. |
| 2006/0206912 | A1 | 9/2006 | Klarfeld et al. |
| 2006/0212904 | A1 | 9/2006 | Klarfeld et al. |
| 2007/0203794 | A1* | 8/2007 | Hajdukiewicz et al. ........ 705/14 |
| 2008/0040749 | A1 | 2/2008 | Hoffberg et al. |
| 2008/0120186 | A1 | 5/2008 | Jokinen et al. |
| 2008/0134243 | A1 | 6/2008 | Klosterman |

FOREIGN PATENT DOCUMENTS

| | | |
|---|---|---|
| EP | 0823815 | 2/1998 |
| EP | 0838951 | 4/1998 |
| EP | 0851681 | 7/1998 |
| EP | 0854645 | 7/1998 |
| EP | 0909095 | 4/1999 |
| EP | 982935 | 3/2000 |
| EP | 982935 A2 * | 3/2000 |
| EP | 1045582 | 4/2000 |
| EP | 1045582 | 10/2000 |
| EP | 0774866 | 4/2002 |
| EP | 1331814 | 7/2003 |
| JP | 09128276 A | 5/1997 |
| WO | 9222983 | 12/1992 |
| WO | 9413107 | 6/1994 |
| WO | 9421081 | 9/1994 |
| WO | 9501057 | 1/1995 |
| WO | 9609721 | 3/1996 |
| WO | 9631980 | 10/1996 |
| WO | 97/41673 | 11/1997 |
| WO | 9748230 | 12/1997 |
| WO | 9750251 | 12/1997 |
| WO | 9828906 | 7/1998 |
| WO | 99/01984 | 1/1999 |
| WO | 99/55066 | 10/1999 |
| WO | 00/02380 | 1/2000 |
| WO | 00/04708 | 1/2000 |
| WO | 00/11869 | 3/2000 |
| WO | 00/33160 | 6/2000 |
| WO | 0117250 | 3/2001 |

OTHER PUBLICATIONS

API Requirements for the Advanced Set-Top Box, by Open-Cable, Jun. 5, 1998.
The Challenges of Convergence for Set-Top Box Manufacturers; IBM Microelectronics, Jun. 5, 1998.
White Paper, Set-Top Box Solutions: Helping Customers Meet the Challenge of Convergence; IBM Microelectronics, Jun. 5, 1998.
Set-Top Box Peripheral Chip; IBM Microelectronics, Jun. 5, 1998.
Set-Top Box Reference Design Kit; IBM Microelectronics, Jun. 5, 1998.
Set-Top Box Solutions; IBM Microelectronics, Jun. 5, 1998.
OpenTV Operating Environment, Technical White Paper, OpenTV, Inc., Jun. 8, 1998.
Application Development for OpenTV, Technical White Paper, OpenTV, Inc., Jun. 8, 1998.
Kageyama et al., "A Free Time_Shift DVD Video Recorder"; Aug. 1997, IEEE pp. 463-473.
Office Action Issued in Japanese Patent Application No. 002179/2002, Jan. 15, 2008 (English Translation enclosed).
U.S. Office Action for U.S. Appl. No. 10/177,236 mailed on May 22, 2009.
U.S. Office Action for U.S. Appl. No. 10/177,236 mailed on Sep. 10, 2008.
U.S. Office Action for U.S. Appl. No. 10/177,236 mailed on Mar. 25, 2008.
U.S. Advisory Action for U.S. Appl. No. 10/177,236 mailed on Dec. 7, 2007.
U.S. Office Action for U.S. Appl. No. 10/177,236 mailed on Oct. 2, 2007.
U.S. Office Action for U.S. Appl. No. 10/177,236 mailed on Apr. 10, 2007.
U.S. Advisory Action for U.S. Appl. No. 10/177,236 mailed on Dec. 20, 2006.
U.S. Office Action for U.S. Appl. No. 10/177,236 mailed on Aug. 25, 2006.
U.S. Office Action for U.S. Appl. No. 10/177,236 mailed on Mar. 10, 2006.
U.S. Office Action for U.S. Appl. No. 10/177,236 mailed on Oct. 7, 2005.
Ravikant, N. et al., API Requirements for the Advanced Set-Top Box, Sep. 2, 1997, 14 pages.
IBM, The challenges of convergence for Set-Top Box manufacturers, Nov. 19, 1997, 14 pages.
IBM, Set-Top Box Solutions: Helping Customers Meet the Challenges of Convergence, Mar. 1997, 2 pages.
IBM, Set-Top Box Peripheral Chip, Mar. 1997, 3 pages.
IBM, Set-Top Reference Design Kit, Mar. 1997, 3 pages.
IBM, Set-Top Box solutions, Mar. 1997, 5 pages.
OpenTv, Inc., OpenTV Operating Environment, Feb. 1998, 9 pages.
OpenTV, Inc., Application Development for OpenTV, Feb. 1998, 11 pages.
Metabyte Networks, Inc., Metabyte Personalizes Microsoft TV, Jun. 14, 1999, 1 page.
Oracle Corporation, Oracle Lite: The Client Database for Java, Jun. 5, 1998, 2 pages.
OpenCable, Reference Material, Oct. 21, 1997, 1 page.
StarSight Telecast, Inc., StarSight: The Interactive On-screen TV Program Guide Service with One-button VCR Programming, Jun. 9, 1998, 3 pages.
StarSight Telecast, Inc., StarSight: An Introduction, Jun. 9, 1998, 1 page.
TVData, Services for On-Screen Guides, Jun. 9, 1998, 1 page.
TVData, The Largest Databases of Television Information in the World, Jun. 9, 1998, 1 page.

* cited by examiner

METHOD AND SYSTEM FOR ELECTRONIC PURCHASES USING AN INTELLIGENT DATA CARRIER MEDIUM, ELECTRONIC COUPON SYSTEM, AND INTERACTIVE TV INFRASTRUCTURE

CROSS-REFERENCE TO RELATED APPLICATIONS

This application is a Divisional Patent Application under 35 U.S.C. §120 of U.S. patent application Ser. No. 10/177,236 filed Jun. 21, 2002, which in turn, as does this application, claims priority under 35 U.S.C. §119(e) from U.S. Provisional Patent Application Ser. No. 60/299,935 filed Jun. 21, 2001.

This application claims the benefits under 35 U.S.C. §119 (e) of provisional application No. 60/299,935 filed on Jun. 21, 2001.

BACKGROUND OF THE INVENTION

Field of the Invention

The present invention lies in the field of electronic systems and methods for transacting a purchase between a purchaser and a merchant. More specifically, the invention relates to systems and methods for facilitating purchases over an interactive network, and particularly using an interactive television system.

Today, electronic purchases represent a large and continuously increasing percentage of all new purchases. In a transaction for a purchase, the purchaser typically has the ability to pay using different payment methods. For example, consider a purchaser in a store wishing to buy a computer. The purchaser can pay for the computer with cash or check. The purchaser might also wish to use a credit card or a debit card.

However, the store might only accept a few of these forms of payment, while not accepting other forms of payment. The department store often posts these accepted forms of payment at the point-of-sale ("POS") counter.

During the purchase transaction of the computer, the purchaser notes the forms of payment accepted by the department store. The purchaser then pays using a suitable payment method. If the purchaser chooses to pay with a check, the sales person performs an authentication process. The sales person may only accept the check if the person presents an identification card to verify the authenticity of that person who is offering the check.

If the purchaser uses a credit card to pay, the sales person verifies that the purchaser has sufficient funds in the credit card account and has not exceeded the credit limit. This is done by passing the credit card through a magnetic-stripe card reader, that is located at the POS counter to electronically read the purchaser's account information contained in the magnetic stripe on the credit card.

Then, the account information is validated with the card issuer. Alternatively, a computer user may want to make a purchase from an on-line service provider. The user orders the desired service electronically over an interactive network. One of the issues arising relates to protecting the purchaser's identity. An electronic system should block the merchant from access to the purchaser's private information.

The electronic Smart Card (sometimes called Chip Card) is a superior alternative to the magnetic stripe payment card (credit card) and is in wide use in Europe, though much less so in the United States. Its main advantageous use has been as a stored-value (money replacement) card, which is suitable even for the small transaction conducted by the card itself. The relatively expensive verification for every transaction, using communications to a network server, is not done.

The original version of a one-application card (e.g., a phone card having stored money for phone calls) is not versatile or sophisticated enough, and therefore new architectures are required.

The cryptographic and multi-application Smart Card, a recent development, features an embedded microprocessor with special circuitry to perform mathematical calculations quickly. It also contains up to 32K of memory for storing data, application executables and digital credentials.

Typically, the memory hardware has enhanced protection features for security to isolate applications and the operating system from one another. The card is also able to perform complex calculations for functions such as encryption and digital signatures, and can contain identification (e.g., a photograph).

The card in conjunction with Public Key Encryption technology can be used to encrypt data on the card. This combined with a procedure for creating the digital signature of a document (Public Key Infrastructure, hereinafter "PKI") creates a legally binding document and transaction. Incentives can be securely handled with credits and payments accounted as real money.

The application, which is of interest here, is a combination (stored value and PKI) card. This allows value to be saved in one or more accounts on the card and to move the value, via local area networks (LANs) and the Internet, to servers where required or when checking is necessary.

Prior and current developments by the assignee, MetaByte Networks Inc. (MNI) deal broadly with systems and technology for TV Ad and program targeting to specific user profiles and parameters. These developments are also reflected in several prior patent applications, including:

"System and Method for Generating and Managing User Preference Information for Scheduled and Recorded Television Programs," U.S. patent application Ser. No. 10/156,153, filed May 28, 2002, which claims priority of U.S. Provisional Patent Application No. 60/293,763, filed May 25, 2001 , and the related application "Database Management System and Method for Electronic Program Guide and Television Channel Lineup Organization," U.S. patent application Ser. No. 10/156,173, filed May 28, 2002, which also claims priority of U.S. Provisional Patent Application No. 60/293,763, filed May 25, 2001 . These applications are herewith incorporated by reference.

"System & Method for Targeted Advertising", a copending patent application describing a DTV or STB payment card or smart card for paying for programs without advertising, where advertising with the program has been refused by the user, and our copending application entitled "System and Method for Behavioral Model Clustering in Television usage, Targeted Advertising via Model Clustering, and Preference Programming Based on Behavioral Model Clusters," U.S. patent application Ser. No. 10/043,698 filed Jan. 9, 2002 and based on provisional application No. 60/260,745 filed Jan. 9, 2001. The copending applications are herewith incorporated by reference.

"Television Program Recording with User Preference Determination," application Ser. No. 09/096,592, which is herewith incorporated by reference.

The copending, earlier applications "Logic Operators for Delivery of Targeted Programming", and "Improved Logic Operators for Delivery of Targeted Programming," describe targeting metadata attached to a TV program or other content for the purpose of targeting it to certain users that satisfactorily match certain criteria detailed therein. Example criteria include program content types, input or inferred demographics, products, universal product codes (UPC) and industry type codes, whereas extended system architectures for explaining how such product code information might arrive in the STB equipment was, at the time, not provided. The copending application is herewith incorporated by reference.

Of particular interest is our concurrently filed, copending application entitled "Method and System for Electronic Purchases Using an Intelligent Data Carrier Medium, Electronic Coupon System, and Interactive TV Infrastructure," application Ser. No. 10/177,236, which is based on the same provisional application as the instant application and which is herein incorporated by reference. Our copending application contains technical details concerning the smart card and the e-coupon systems which are also important in the context of the instantly described model.

SUMMARY OF THE INVENTION

Referring now to the television STB, a first, original, smart card is still necessary for authentication of right to use the broadcast services and for decryption of some services, and must remain in the STB for operation and cannot be removed. The cryptographic and multi-application smart card for user retail incentives and purchasing must be an additional (i.e., a second), removable card.

The present invention is directed to a method for electronically transacting a purchase. The method includes storing accrued incentives on an intelligent data carrier medium via DTV/STB equipment and redeeming a discount or a value corresponding to the accrued incentives present on the data carrier medium when a purchase is made. The present invention also discloses an extended system architecture for explaining how product code information can arrive in the STB equipment (using Smart Card technology).

Further, the present invention is directed to securely administering user targeted incentives/discounts, credits/payments and dollars/mileage points incurred at Direct Television/Set-Top-Box ("DTV/STB") user equipment and their later use at the DTV/STB (or elsewhere) for making a purchase. Some examples include credit for viewing program contents (e.g., advertisements, "ads"), positively interacting with broadcast content material (e.g., advertising), direct marketing information or a game that leads to one or more commerce transactions at the DTV/STB, at a Point Of Sale (POS) or at a different location. Another example is payment (debit) for not viewing program contents.

This new extended TV/STB architecture enables service/product selections and purchases to be conducted outside of the normal TV domain (i.e., at the regular high street, retail store, airline, general business and commerce domains). Thus, user interaction at the DTV/STB can be kept to a minimum (i.e, only for claiming and accruing credits, discounts and incentives), and the purchases can be made at the regular and preferred "brick and mortar" locations.

Further, targeted content at the DTV/STB can be used to encourage users with incentives to go to certain retail locations to make their purchases. "Smart Card" is the medium used to capture and convey the incentives.

All retail purchases made at the time the SC (or incentive) is used are recorded on the SC, and the information is returned to the DTV/STB. When the SC is re-docked in the terminal for capturing more incentives, the information is processed and added to the preferences database (as preferred products) and is used to improve the demographic inference. Now the targeting is aimed at the improved user demographic profile, including the products directly. Users with a purchase history of a certain product can be treasured and targeted with better or different incentives (e.g., free T-shirts to retain their loyalty).

DESCRIPTION OF THE PREFERRED EMBODIMENTS

Figure 1:
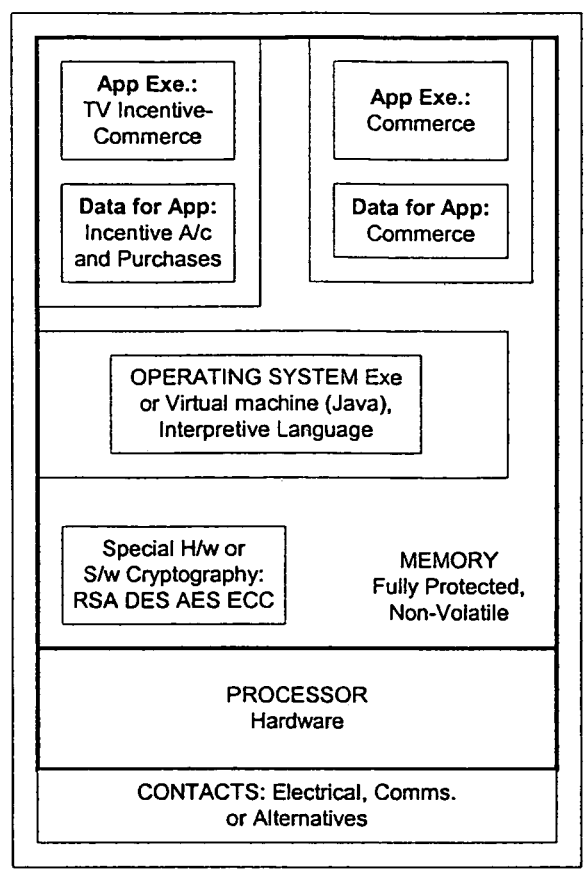
FIG. 1 is a block diagram of a multi-application and cryptographic smart card.

In all the figures of the drawing, sub-features and integral parts that correspond to one another bear the same reference symbol in each case.

Referring now to the figures of the drawings in detail and first, particularly to FIG. 1 thereof, there is shown a block diagram of a multi-application and cryptographic smart card (prior art).

Figure 2:
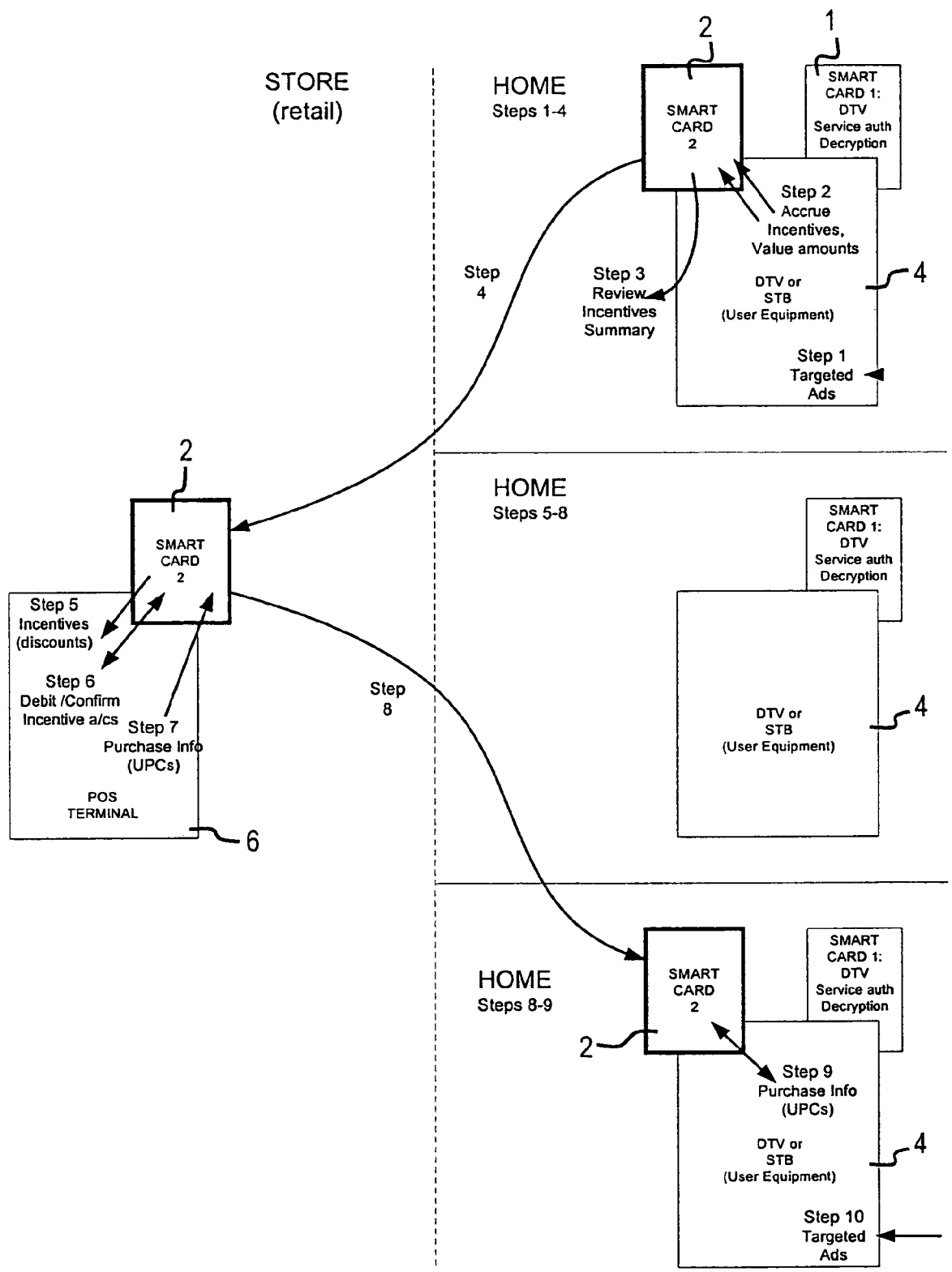
FIG. 2 is a DTV/STB architecture, as extended to a retail store with an incentive smart card, according to the invention.

FIG. 2 shows the DTV/STB architecture, as extended to a Retail Store with an Incentive Smart Card in accordance with the invention. It illustrates a system that implements the electronic commerce system according to an aspect of the present invention. A selected portion of the software may reside in the user equipment DTV/STB 4 in the form of an insertable intelligent data carrier medium/smart card 2.

The user equipment DTV/STB 4 may also be used for access to a network (e.g., Internet). The smart card 2 is removably attached to the user equipment DTV/STB 4. Further, the smart card 2, for example, may contain data such as personal information and account information.

One important element of the new architecture is the inclusion of the second Smart Card 2 ("SC 2") at the user equipment DTV/STB 4 to securely manage accrual and delivery of incentives and to deliver retail purchase information back to the DTV/STB. The retail purchase information is then used to improve the attraction of content and further (loyalty) incentives, thus encouraging more card and service use. In general, the more the system is used (and the SC is used), the better the system works and the more benefits the user receives.

Direct marketing to a group, and user interaction earned value is cached on the Smart Card 2 followed by item purchase at a retail POS 6.

The overall operation of the DTV/STB architecture is extended with an Incentive/Purchase Smart Card. FIG. 2 shows three views of the DTV/STB user equipment 4 with different steps of the operation. The Smart Card 1 almost always remains in the DTV/STB 4. Only Smart Card 2 is shown, but there could be a third smart card (or more if necessary) for more users not willing to share benefits. The first operation is called STEP 1 and proceeds through STEP 9.

Figure 3:
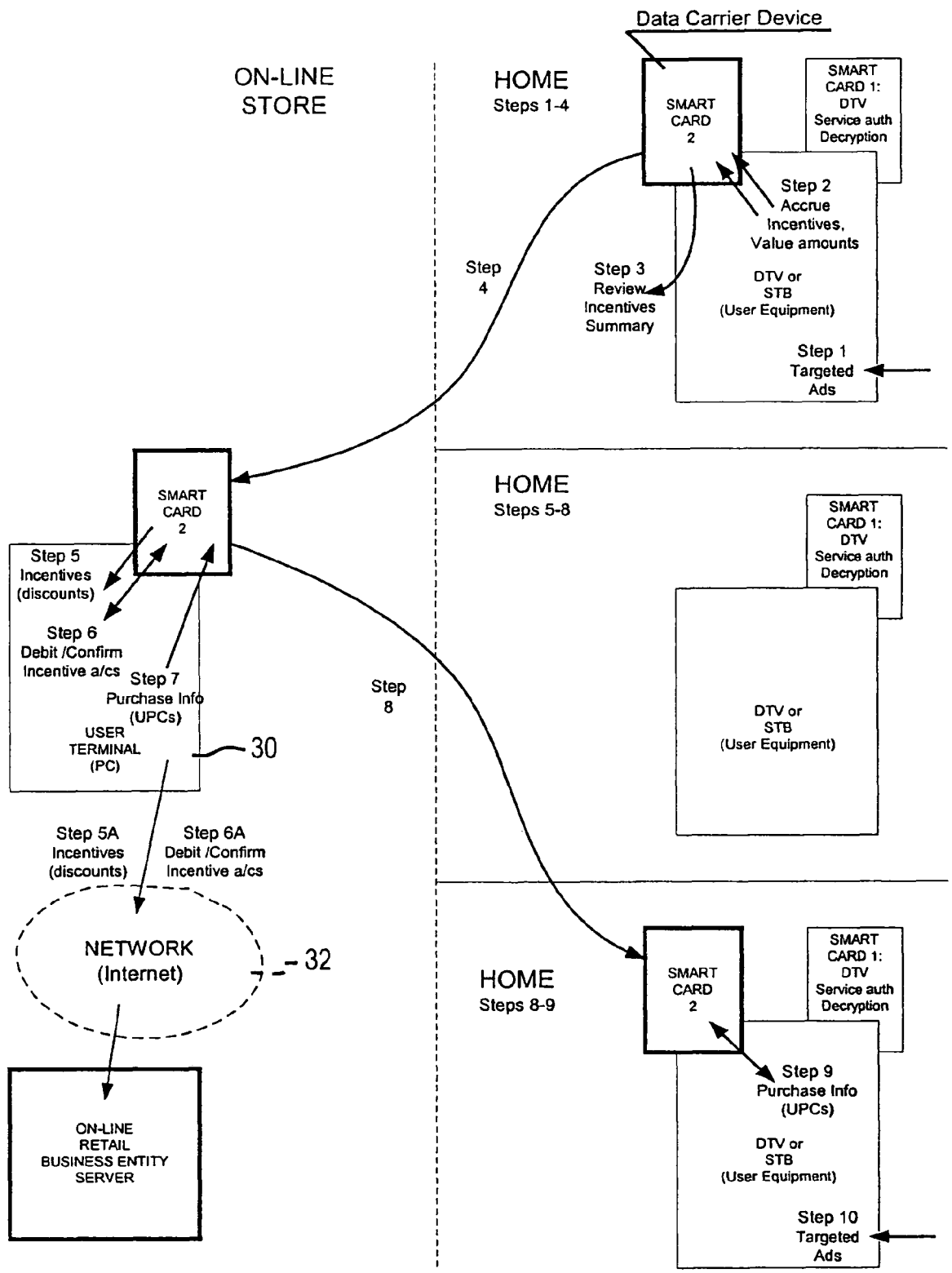
FIG. 3 is DTV/STB architecture, as extended to On-Line Store with Incentive Smart Card, according to the invention.
Figure 9A:
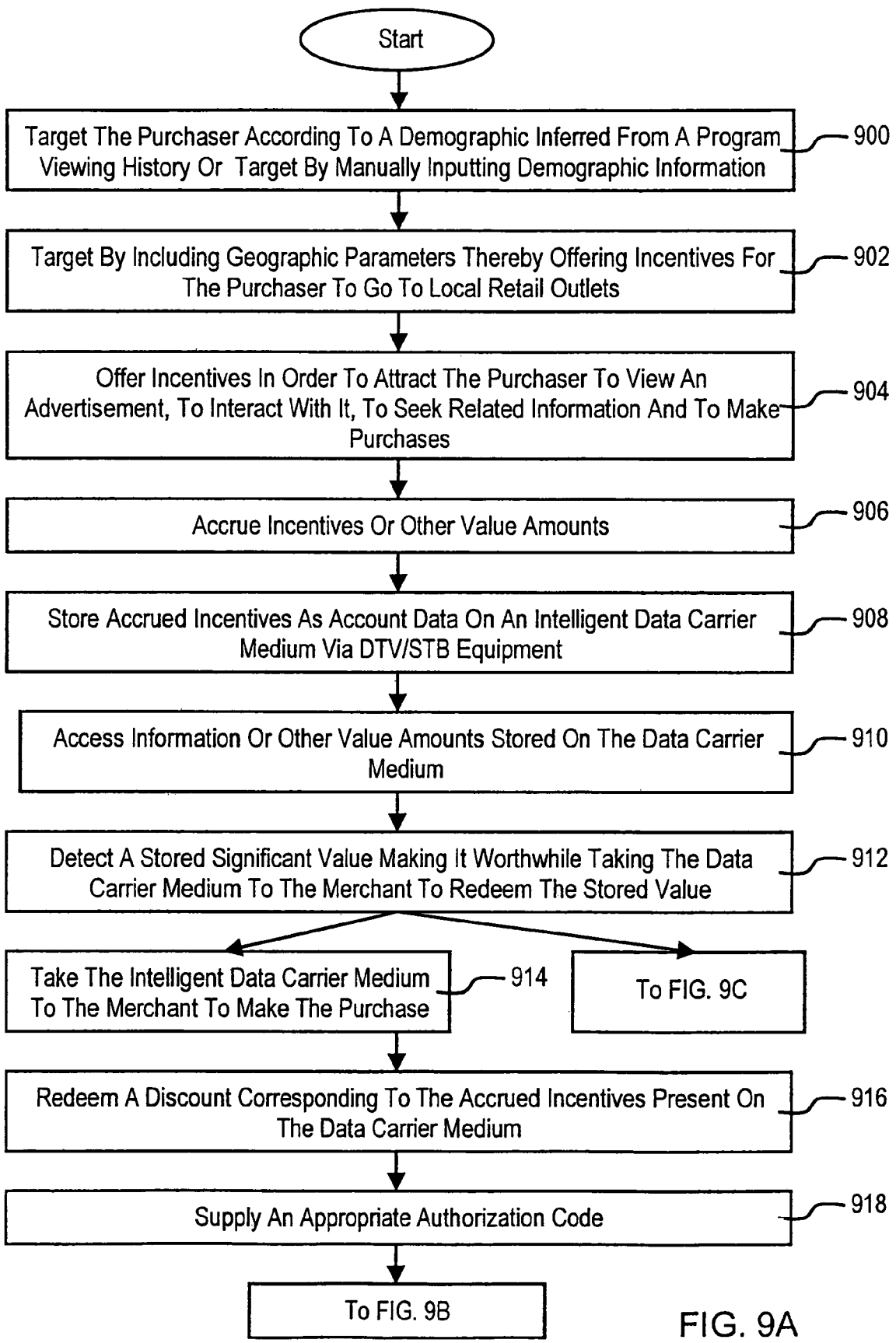
FIG. 9A-9B show a flow chart for the method according to the invention in a retail store context.
Figure 9B:
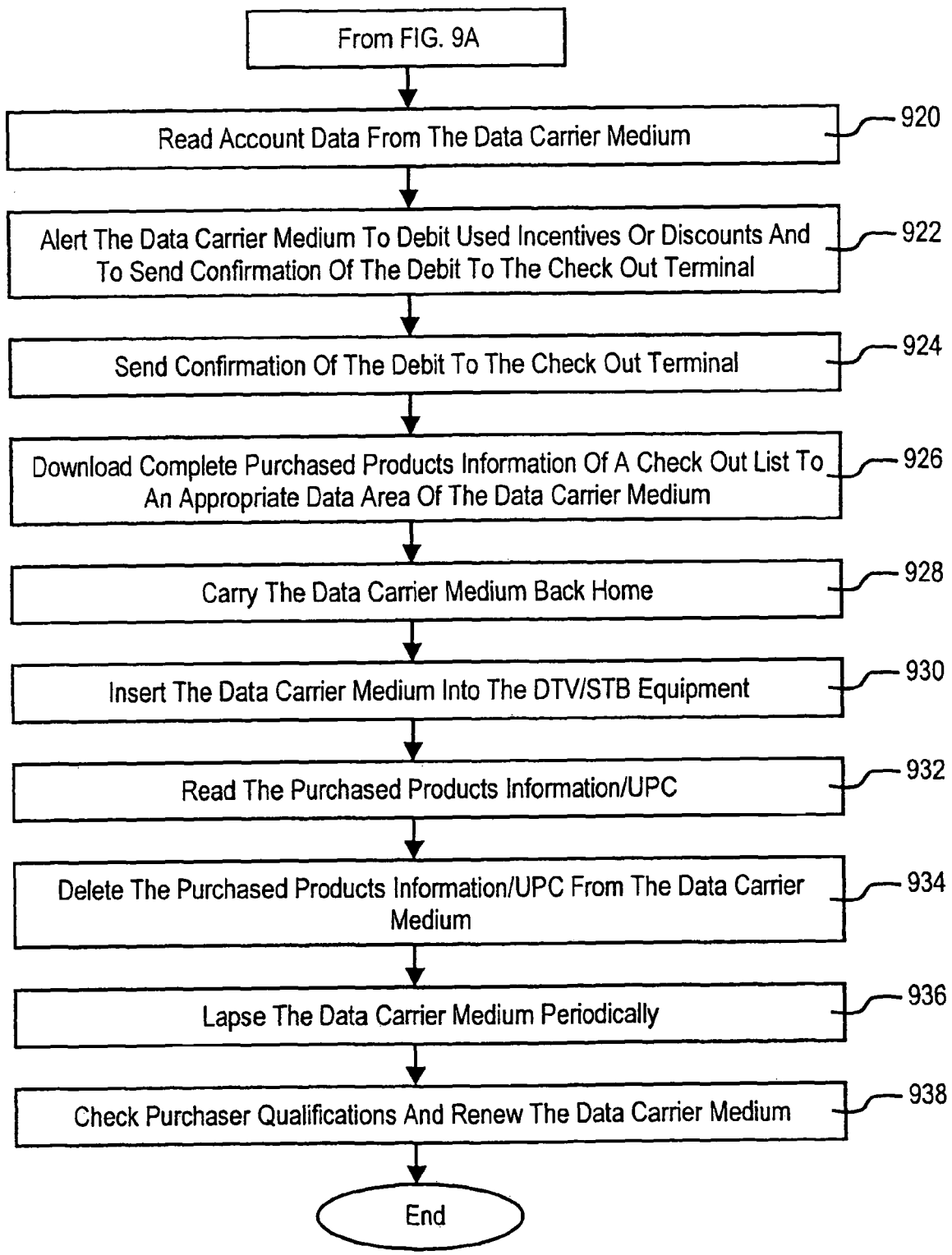
Figure 9C:
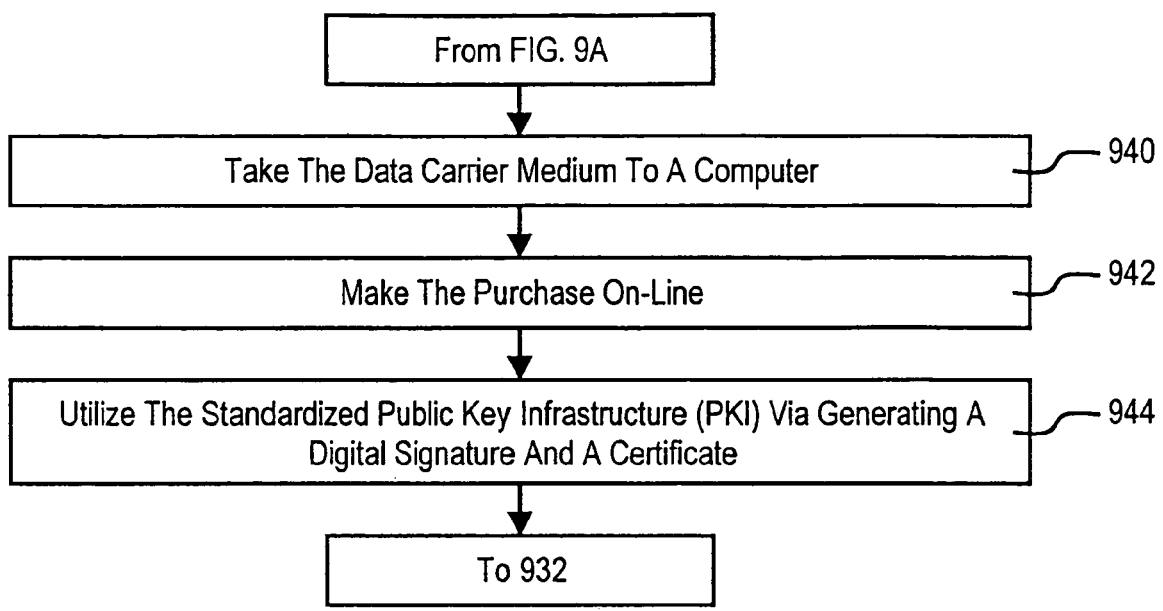
FIG. 9C is a flow chart for the method according to the invention in an on-line context.

FIGS. 9A-9B show a flow chart of these steps of the method according to the invention in a retail store context. FIG. 3 shows DTV/STB architecture, as extended to On-Line Store with Incentive Smart Card, according to the invention. FIG. 9C shows a flow chart for the method according to the invention in an on-line context.

At step 900, targeting is initially to a user demographic inferred from the program viewing history or to manually input demographic information.

Ads are targeted for products with a high interest level inferred from the inferred demographic. At step 902, targeting may frequently include geographic parameters, thereby offering incentives for users to go to local retail outlets. At step 904, incentives or discounts are offered in order to attract the user to view the ad, to interact with it and seek information or make purchases, thus showing high interest.

At step 906, incentives, money or other value amounts are accrued and saved as account data by an appropriate application (shown in FIG. 5) on the Smart Card 2 at the DTV/STB 4 via either ad impression (i.e., simple viewing) or interaction with the initial presented ad top-layer page. The interaction may also occur with the ad hierarchy lower layers or similar ad detail activity, or by receiving random/earned award or reward value amounts.

An appropriate application and appropriate account data mean appropriate for the MNI's Megabyte TV (MbTV) incentive application. The multi-application card may have more accounts. The Smart Card comes with a standard method for the discovery of the applications on-board the SC and a standard for authorizing communications with the correct application. The MbTV application uses the standardized SC methods.

At step 908, accrued incentives are stored as account data on the intelligent data carrier medium SC 2 via DTV/STB equipment 4. At step 910, while the SC 2 is still docked in the DTV/STB 4, the user accesses information stored on the card (by using a GUI). At step 912, the user detects that there is a significant value stored making it worthwhile taking the card to a retail store or POS 6 to redeem the stored value.

At step 914, armed with the accrued incentives, the user takes the intelligent data carrier medium SC 2 to the merchant's POS 6 to make the purchase, redeem discounts or airline mileage (or, whatever value is on the card). Alternatively, the user may take SC 2 to a computer (PC) 30 to make an on-line purchase (at step 940).

At step 916, the user redeems a discount corresponding to the accrued incentives present on the data carrier medium SC 2. At step 918, the user supplies an appropriate authorization code to the POS 6. At step 920, the POS 6 reads the account data from the appropriate application on SC 2.

At step 922, as purchases are made (at the POS terminal 6), the SC (account data application) 2 is altered to debit the incentives or discounts used. At step 924, the SC 2 is altered to send back confirmation of the debit to the check out terminal 6.

At step 926, the complete purchased products information (including retail store name/UPC, manufacturer name/UPC and product name/UPC) of a check out list is downloaded to the appropriate application data area of SC 2.

At step 928, armed with the somewhat-depleted SC 2, but anxious to replenish it, the user carries the SC 2 back home. At step 930, the user inserts SC 2 into the DTV/STB user equipment 4.

At step 932, the appropriate DTV/STB agent 4 reads the purchased products information or UPCs. At step 934, the appropriate DTV/STB agent 4 deletes the purchased products information/UPCs from the SC 2.

The method also may include a step where the SC 2 expires periodically (at step 936). An issuing authority checks purchaser qualifications and renews the data carrier medium sc 2.

User Interaction earned value cached on Smart Card followed by item purchase at Network Connected POS:

Referring again to FIG. 3, it shows the DTV/STB architecture, as extended to On-Line Store with Incentive Smart Card. The overall operation of the DTV/STB architecture is extended with an Incentive/Purchase Smart Card 2 and additionally permits an extension to an On-Line commercial service for making the purchase. FIG. 3 shows three views of the DTV/STB user equipment to illustrate different steps of the operation. The Smart Card 1 almost always remains in the DTV/STB. Smart Card 2 only is shown in use, but there could be a Smart Card 3 (or more) if necessary for more users who do not wish to share benefits.

Accordingly, an on-line book order/purchase, for example, can be made via a home PC 30 at www.amazon.com (at steps 940 and 942). In addition, the DTV/STB 4 may permit this purchase directly if it were connected on-line 32, thus eliminating the PC terminal 6 and saving the user the removal and physically carriage of the SC to another place (step 940). Also, part of the network may be a home network.

FIG. 3, as compared with FIG. 2, has additional steps 5A and 6A. The standardized Public Key Infrastructure ("PKI") that includes generation of a digital signature and a digital certificate (to guarantee unaltered delivery of the account information received remotely via a network) is employed (at step 944). Completion of step 944 leads to step 932.

The PKI operations and key storage are preferably performed by the security specialized hardware of the SC 2 because they are performed more securely than by the user equipment DTV/STB or PC. In the event of a breach of the SC security, only the card needs to be replaced to fix the problem, thereby minimizing the costs and inconvenience associated with the breach.

The structure and components for carrying the above method are explained below in a more detailed manner.

User Preference Determination extended with Smart Card to include Purchased Products:

Preference Determination Engine (PDE) technology was originally developed for the DTV or STB for the automatic learning of user preferences for TV programs, video on demand (VOD) movie programs, interactive TV content or presentable content in general. Increasingly, most DTV/STB equipment is being developed with computer type technology, including random access program storage (e.g., hard disc storage).

The program or content preferences may direct automatic program selection to ensure that preferred programs are almost always available in the program storage for the user to watch at his convenience. A conversion step infers the user demographic profile from the program preferences, which is used for targeted advertising with a hit if the target metadata of the ad matches the profile of the user. Audio/video (A/V)

programs as well as Interactive TV type (I-TV) graphical user interface (GUI) content (including sale of items) may be targeted.

Ad and commercial interactions, and items purchased, which are conducted at the DTV/STB can also add (product) information to the preference database and enhance the accuracy of the profile.

However, the DTV/STB, optimized for cost and video presentation, is generally slow at processing graphics pages, and user interaction with a TV type remote control is generally cumbersome. Therefore, the expected user uptake of new GUI and I-TV technology for making a purchase selection using ads, commerce and product-for-sale graphics pages (or AV) is not expected to be high in the near term.

Figure 4:
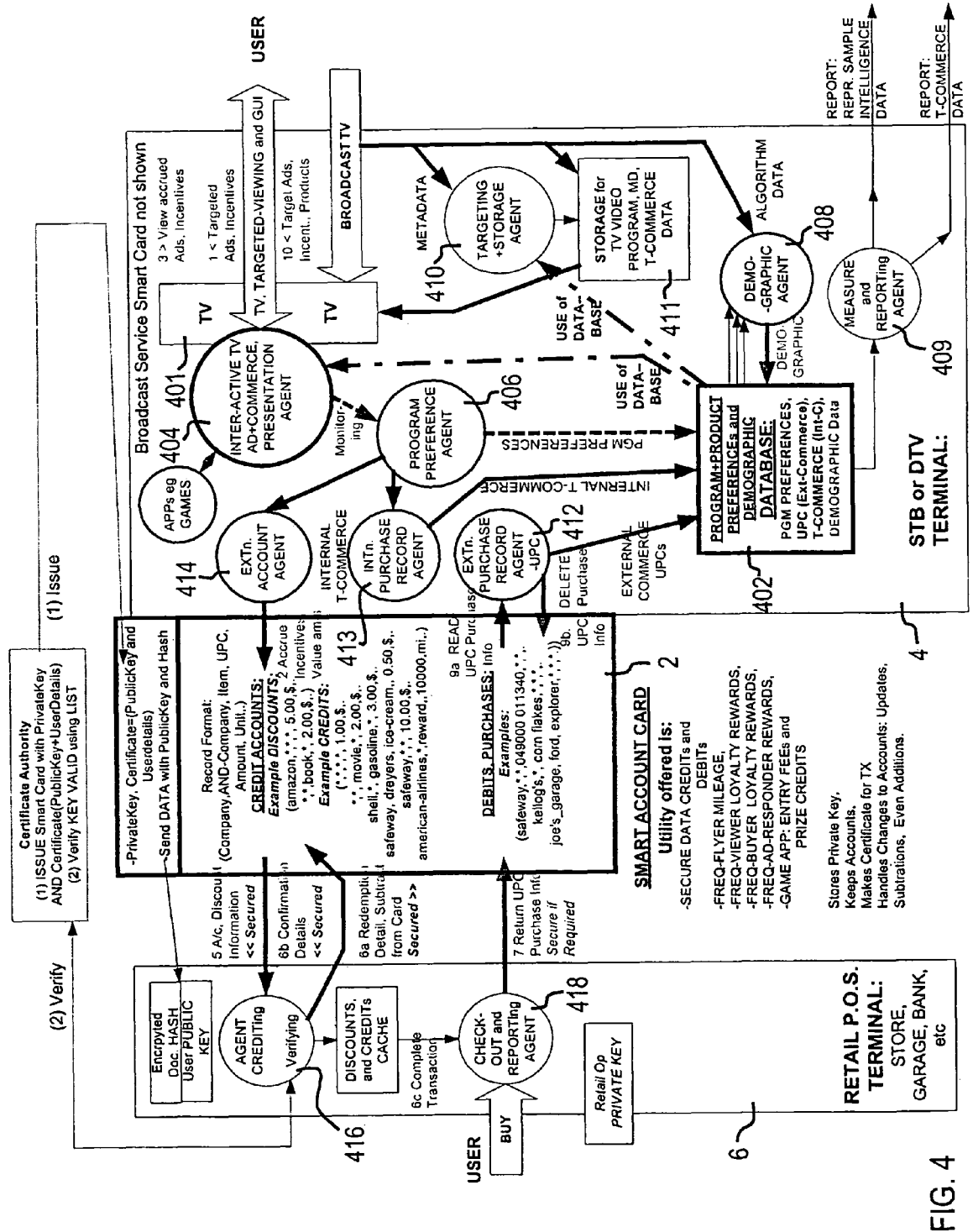
FIG. 4 shows the relevant internal components of three pieces of equipment, namely, DTV/STB PDE, Smart Card (SC) and Retail Point of Sale terminal (POS), according to the invention.

FIG. 4 shows the relevant internal components of three pieces of equipment: namely, DTV/STB PDE; Smart Card (SC) center and Retail Point of Sale terminal (POS), in terms of their controlling agents (shown in circles); and databases (shown in blocks), which are normally implemented in software.

Annotation notes are included in FIG. 4 showing the operational flow and demonstrating how the system loops or feeds back product information to the DTV/STB preference database 402, thereby becoming part of the user profile, which is subsequently used for the targeting of ads, commerce and services.

FIG. 4 shows a user using a TV 401, interacting with the TV 401, and viewing targeted content (see note 1) or GUI materials partly selected by the Presentation Agent 404 (shown in a large circle overlapping the TV block). Interacting may be the normal DTV/STB use (e.g., viewing TV or channel changing) or may be a more sophisticated use (e.g., selecting a VOD movie using Interactive-TV GUI screens).

User activity is monitored by a connected Program Preference Agent (PPA) 406, which results in the information being recorded in the Program Preference Database 402. The PPA 406 also performs maintenance and processing on the database 402, which includes examining and sometimes combining data rows (for example, to demonstrate a general content preference).

In addition, there is a Demographic Agent 408 for inferring the user demographic from preferences deemed from the database contents (in the event that the user has chosen not to input his demographic directly).

The Algorithm conversion data for inferring demographics (as shown by the arrow to the demographic agent 408 in FIG. 4), delivered to all user STBs from the targeting system operator, is computed and produced using a representative STB sample (known willing users) usage intelligence feedback to the targeting main operator system, as shown by the arrow from the Measure and Report Agent 409.

In addition, ad and ad incentive campaign effectiveness and targeting effectiveness are partly based on the feedback from STB sample using Measure and Report Agent 409.

Reiterating: A first feedback via SC 2 from merchant or terminal 6 to STB 4 is given, and then a second representative STB sample feedback to the targeting system operator is sent.

The dash-dot lines show database usage by a Targeting and Storage Agent 410 to determine what programs or other content to be stored (in a program Storage box 411), and by the Presentation Agent 402 to determine what content to be presented to the user.

This represents the regular Preference Engine 406, which learns program and content preferences using the database 402, makes preferred programs, content available to the user, and subsequently improves the database 402 as the preferred content is used.

If interactive graphics content is also shown via which the user makes a purchase at the DTV/STB, it is monitored using an Internal Purchase Record Agent 413 and causes a product entry in the preference database 402 using Universal Product Codes (UPC) or standardized product description originally made available (e.g., via the broadcast system downloaded metadata). In this case, a second Smart Card SC 2 is not required if the DTV/STB 4 is in communication with an operator or seller's server (e.g., via broadband or telephone-data connections), and is able to use the payment system, which is normally in place for the broadcast system (e.g., cable or satellite) service payments.

However, with just the original broadcast service smart card 1, services or possibilities for new services are narrow in scope and are confined to the broadcast system (e.g., incentives for, and then purchases of, Near-video-in-demand (NVOD) or VOD movies, purchases of products advertised via the broadcast system and subsequently delivered by the broadcast system or delivered later by mail).

With a second additional user Smart Card 2, services can be of a much wider scope: for example, the user can be encouraged by an ad or by using a service, and also by an incentive or a discount to purchase a product or service from a retail establishment (e.g., a bottle of Pantene hair shampoo from Longs Drugs store, or Baskin Robbins ice cream). This collection and accrual of incentives is done via the second Smart Card 2 (see note 2) and a GUI user interface is provided for viewing the incentives or accounts on the SC 2 (see note 3). The Smart Card 2 is removed from the DTV/STB 4 and is carried to the retail POS terminal 6 (see note 4).

The combination of the incentive Smart Card 2 with content targeting is even more powerful. The retail store has a Smart Card reader 6 at their POS terminal (currently, equipment is available that can read both a magnetic stripe (e.g., VISA type) card and an electronic-chip Smart Card). Few examples of utilization are listed as follows:

- When a new Baskin Robbins is opened, users in the respective district can be targeted with incentives to discover and use the new ice cream store.
- Viewer of a movie or VOD movie gets free popcorn and coke, redeemed at the participating supermarket.
- As the user skips the coke ad using personal video recorder (PVR) control, he gets a message stating "OK you cheat because you skipped, but you still get the coke discount" or "Sorry, but you only get the discount if you watch the coke ad; you can watch it anytime this evening, and you can double the discount if you interact".
- User wins $20 by playing a game promoting a Las Vegas casino hotel (e.g., maybe a downloaded game application running on the STB 4; see FIG. 4), and can redeem the amount with gamboling chips at the casino.

The Program Preference Agent 406 interfaces with an External (SC) Account Agent 414, when monitored activity detects authorized amounts to be added to or subtracted from the Smart Card accounts, thereby passing the account and amount details to the Account Agent 414. The Account Agent is 414 designed to interface with a counterpart agent (or application) on the SC.

Incentives and discounts often take the form of an electronic coupon, a replacement for the cutout paper coupon. Using a Smart Card for an electronic coupon delivered by TV is a major advance in efficiency for the user and the industry, compared to the current newspaper magazine type coupon. Currently, a paper coupon is cut out manually and goes through many stages of handling by the retail store, clearing houses as well as the manufacturer to ensure there is no fraud. The SC and PKI technology provides a secure electronic coupon that allows fraud free electronic retail redemption and electronic clearing and refunds.

Figure 5:
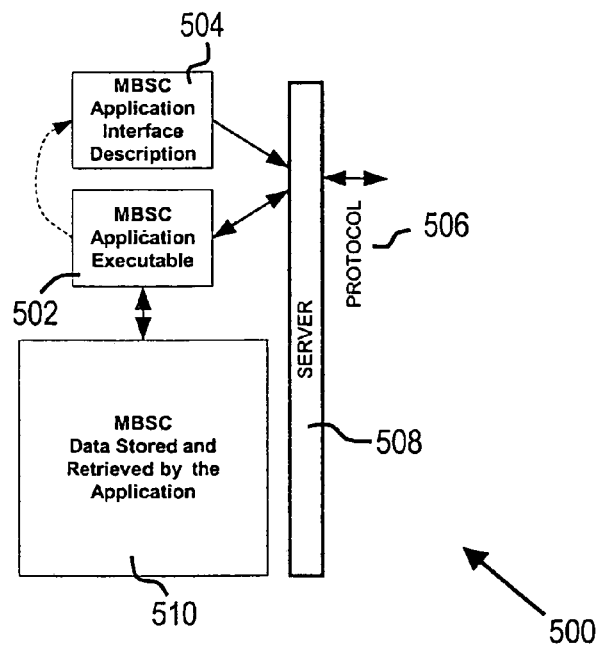
FIG. 5 shows top-level components of the MetaByte Smart Card Application, according to the invention.

FIG. 5 shows three top-level components of the Smart Card Application 500 of the present invention: namely, the application executable 502, interface of the application 504 and the underlying communications protocol 506. This can be implemented in many ways, but the choice of the World-Wide-Web Hypertext Transfer Protocol (HTTP) protocol and Extensible Markup Language (XML) standard is convenient. XML may be converted to a user displayable HTML as needed. The system deploys a standard HTTP Web Server 508 for communications. The Web Server 508 interfaces to the files on the Smart Card 2 (e.g., the App. Interface description 504, and the App. Executable 502).

The standardized XML syntax is used to 'mark-up' MBSC vocabulary, for example, command tokens and data for certain functions or methods supported by the MBSC application. Using a standard 'mark-up' syntax has the advantage that while some (e.g., newly added) vocabulary or encryption may not be understood by the present SC application 500, the XML syntax allows the application 500 to react gracefully and realize that it does not know (and maybe notify the user), rather than hang-up or crash.

The DTV/STB Account Agent 414 (as a client) accesses the Interface Description 504, an XML document that is named with a standard name (e.g., index.xml), using a HTTP 'get' command. This XML interface 'document' exposes the name of the application executable 502 and the names of the functions, methods, data and account data and formats supported. Subsequent 'get' commands to the executable 502 can retrieve SC application or account data via the executable 502. Conversely, 'put' commands put/enter data via the executable 502. Data accounts can be changed and corresponding changes can be made to the XML interface to represent account additions or deletions (as shown by the dotted lines in FIG. 4). The fact that there is a separate interface document, which can be dynamically changed adds great flexibility to the system.

The contents of the XML interface and transmissions (i.e., names of functions, methods, data and account data) are generally encrypted to ensure they can be understood only by applications having the key. The recent cryptographic SC is configured for this job.

Figure 6:
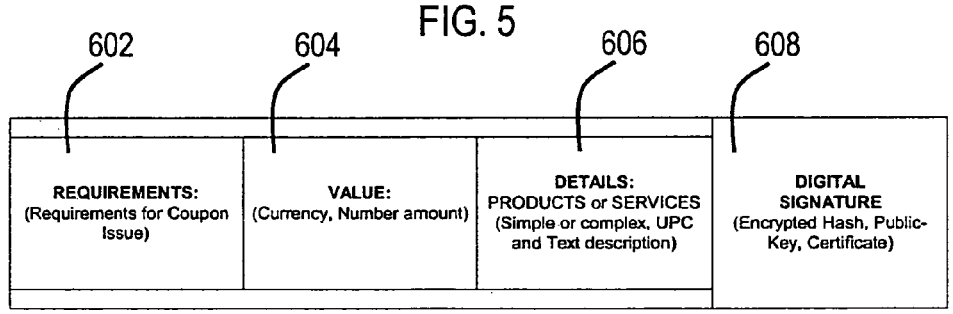
FIG. 6 is the format of an original E-Coupon as published and distributed, according to the invention.

FIG. 6 shows the format of an original E-Coupon as published and distributed. Incentive accounts employ Universal Product Code (UPC) descriptor code numbers, which are already standardized, to define manufacturers and products. They are also used to describe discounts pertaining to a manufacturer, an individual or a family of products and a coupon value. Sometimes, a simple UPC type coupon is all that is required; other times, a more complex combination incentive coupon is required, which is described using multiple UPCs and Boolean operators.

The REQUIREMENTS field 602 for coupon issue include an MNI registered UPC number with code numbers (in product number position) or otherwise standardized text or code to indicate the coupon issue terms, including coupon campaign start and end time and date, ad impression, ad interaction, double-interaction, purchase made at STB and no terms free to all viewers.

The VALUE 604 of coupon may include money ($) or any other currency or other units of value (e.g., airline frequent flier type mileage)

Referring to the DETAILS field 606 of coupon, coupon may be simple or complex (i.e., Boolean), as shown below. Text description is also required (in addition to a UPC) in order to display the coupon information to the user at any time. Without the text, the DTV/STB 4 should have a cross-reference library or access to a cross-reference library.

SIMPLE COUPON: (UPC of Manufacturer, Product or family, also Text description#)

COMPLEX COUPON: (UPC of Manufacturer, Product or family, also Text description#) AND (UPC of Retail-store or other entity, also Text description#), etc., The e-coupon may be transmitted via a broadcast type TV system and can be encoded as program or content metadata using XML Schema. For illustration, see http://www.w3.org/TR/xmlschema-0/ and http://www.w3.org/TR/xmlschema-1/ http://www.w3.org/TR/xmlschema-2/. A number of "industry standards" bodies (e.g., TV-Anytime and MPEG-7) define TV program and content description metadata using XML Schema. The coupon description can be coded using the same style and can be a metadata addition. The XML Schema standard also allows an extendable Boolean description (for a simple or complex coupon).

E-coupons are transmitted from the manufacturer or system operator. The SC 2 does not generate the coupons or discounts. The Account Agent 414 reads the coupon requirements, follows the monitored user interactions and verifies that the appropriate conditions are met, and if affirmative, registers the coupon with the SC 2. Part of this process may be verifying the coupon (using the digital signature 608) for the DTV/STB 4.

The e-coupon set of information is not encrypted, but is accompanied by an originator's or publisher's digital signature 608 using PKI technology to ensure that the information (including the UPC's) has not been tampered with (at any place or in transmission involving broadcast and data networking). The digital signature 608 includes an encrypted hash of the coupon and the coupon originator's public key so that any party can validate the coupon contents by decrypting the hash sent and comparing it against a re-hash of the coupon.

The digital signature 608 can be used to validate the e-coupon at any stage, but an additional security step (which is equivalent to the paper coupon cutout and redemption) should take place to make the e-coupon unique at the earning or issue stage and prevent copying fraud (later in the coupon collection and refund chain).

The e-Coupon has the originator (publisher) digital signature 608 to permit coupon details to be checked to be tamper-free and (at issue) has a second digital signature 710 attached by the Smart Card 2 making the used-coupon unique and thus preventing duplication fraud in the collection and refund stages. Use of the digital signatures allows the coupon SC 2 to also be used at an Internet connected Home PC or any network connected terminal or POS 6.

Coupon manufacturer/product/value details use existing codes (e.g., UPC) and a text description to allow the user to be informed of the details. Complex e-coupons involving a combination of a product/store (e.g., a particular supermarket chain and a particular product) can be described and delivered.

Figure 7:
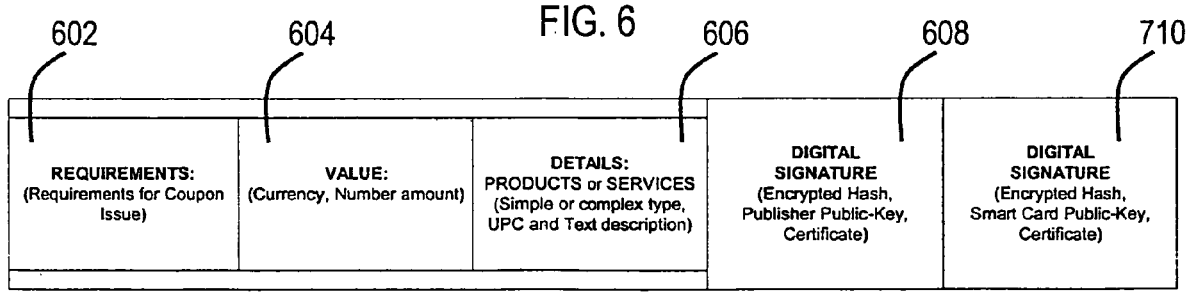
FIG. 7 is the format of the E-Coupon after issue and signed by the user, according to the invention.

E-coupon copying fraud prevention is provided by the Smart Card 2, which generates a second digital signature 710 (with unique public key as shown in FIG. 7) using its own private key, thus making the redeemed coupon (which is the original coupon together with a SC generated digital signature 710) unique. Accordingly, the e-coupon uses double digital signature. The first signature 608 validates the coupon and the second signature 710 validates the use of the coupon.

Moreover, the SC digital certificate can be verified to check whether it is from a valid user or SC 2 (typically, via Internet communications) at any later collection, clearing and refund stages. A unique redeemed coupon with SC 2 validation is a candidate for coupon value refund to the POS store or entity by the coupon originator, although other business entities may also qualify to retain a percentage.

Figure 8:
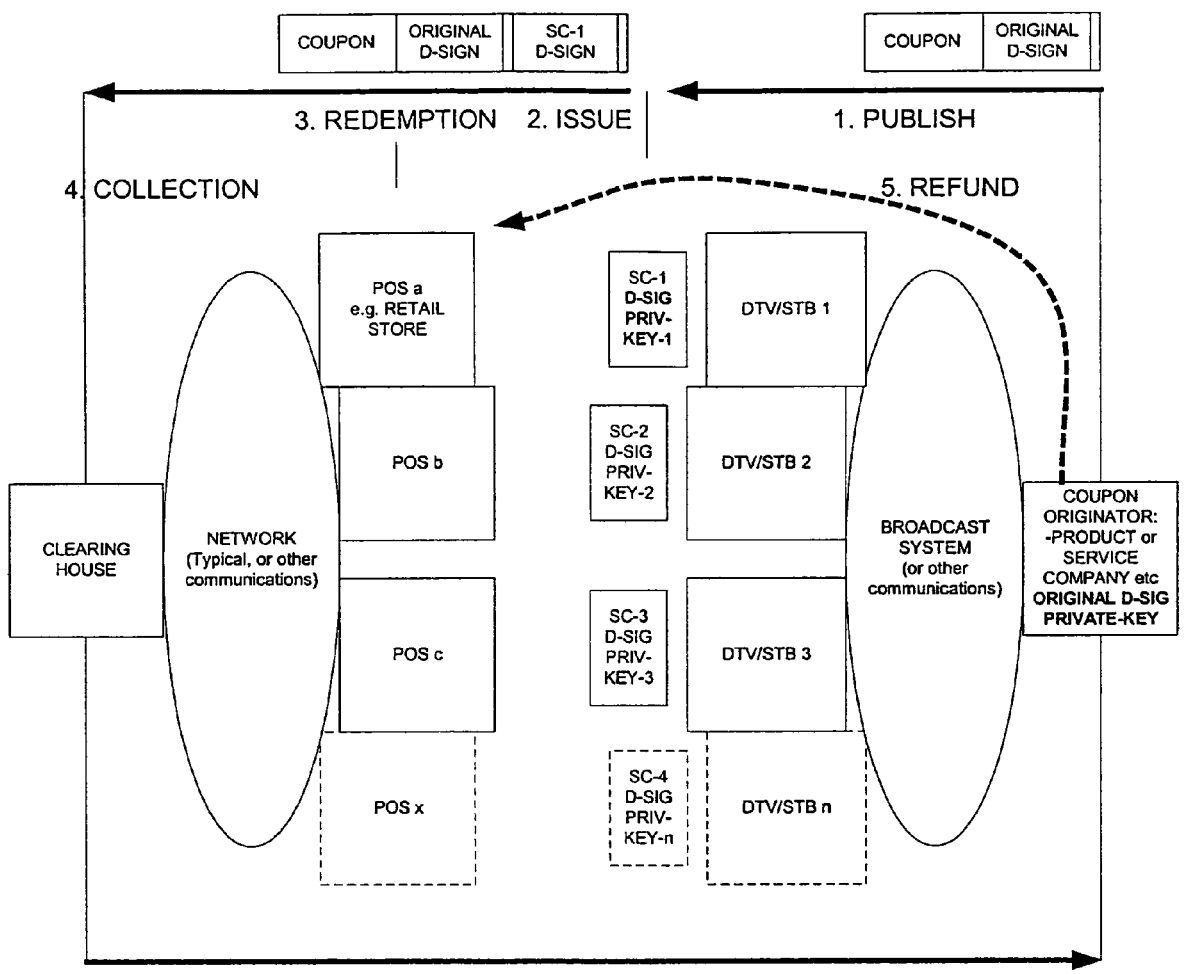
FIG. 8 shows all of the stages in the life of the E-Coupon, according to the invention.

FIG. 8 shows numbered stages (beginning at 1 and ending at 5) of the e-coupon processing, as listed below.
1. Publish (to many, some targeted, or all DTV/STBs 4)
2. Issue (by DTV/STB 4 to SC 2 if the conditions or requirements have been met)
3. Redemption (by business entity, where the user took the SC 2 to redeem the discount)
4. Collection (business entity collects together all coupons and sends (for refund) to the originator, maybe via a clearing house)
5. Refund (coupon value amount is sent back to the business entity that took the SC discount)

Verification may be done, at any point, with additional steps involving a certifying agency.

The Smart Card 2 is removed from the DTV/STB 4 at the user's convenience and is taken to one or more retail stores or service business entities 6. The store 6 has a reader that can read the Smart Card 2 and the application that can interface to the MBSC application 500 (as shown in FIG. 4).

As the SC 2 is docked at the POS terminal reader, a POS Crediting Agent 416 reads the incentives from the SC application 500 and temporarily saves the data locally (see note 5). As purchases are made (or checked out through the POS system 6), a Check Out Agent 418 verifies if discount coupons or other value amounts can be used as credit and subtracts or deletes the used coupon from the SC and receives confirmation of the deletion (see notes 6a and 6b).

Before the SC 2 is un-docked, the POS Check Out and Reporting Agent 418 transfers identification information, (e.g., UPCs) about the products or services purchased, to the SC application data area 510 (annotated note 7).

It is assumed that the retail POS system can process and collate the discount coupons and transfer them electronically to the clearinghouse (or whatever system is in operation) for the recovery and refund of the allowed discounts, value amounts or incentives.

Having some or all incentives or discounts used, the user will re-dock the Smart Card 2 in the DTV/STB 4. A DTV/STB External Purchase Record Agent 412 reads the product/service purchase list from the SC 2 (see note 9a) and deletes the list (see note 9b), thereby conserving valuable SC data storage area. Subsequently, the product information is processed to formulate a suitable preference profile record, which is transferred to the database 402.

Later targeting to the DTV/STB 4 involving the purchased product preferences will register a hit, and will store further content and incentives for the user to accrue according to the coupon requirement rules. The user of the DTV/STB 4, also a user of (preferred) program content, is now additionally treated as a user of certain (preferred) products. By developing and retaining the preference profile at the DTV/STB 4, the user can remain anonymous but still gain the benefit of the selected (targeted) contents and e-coupons.

One or more extra Smart Card slots in the DTV/STB 4 (e.g., two Smart Card slots for two DTV/STB users), and one or more E-Coupon Application or Cryptographic Application Smart Cards may be deployed in them. It may also deploy XML syntax and schema, and standardized SC Application discovery and Application Interface discovery by DTV/STB agent.

E-Coupon Smart Card Application Characteristics

A Cryptographic Smart Card 2 may be issued (by an issuing authority company) to a user, but with no Name or ID actually on the card 2, which allows the user to gather incentives, discounts and to redeem or use them anonymously. The SC 2's serial number can be used by the issuing authority to cross-reference the SC 2 to the owner's name and address, but this is not normally expected or permitted, for example, without written permission from the user.

Periodically, the SC 2 will expire and be re-issued after re-checking the user's credentials (by the issuing authority). The user may be anonymous to any entity involved in the Smart Card E-Coupon Application; although user ID, name and address are known to the issuing authority, they are not necessary components of the Application and need not be made available by the Application.

Coupon Application SC is a medium for carrying the incentive value gained at a DTV/STB 4 (electronic place/terminal) to a (non-electronic) retail establishment 6 for the purchase of the product or service (which was the target of the incentive). This enables the combination of an incentive or discount issued (electronically) at a DTV/STB 4 or other user terminal in one location (e.g., home), to be redeemed (electronically) at another location (e.g., retail store POS or other product or service business entity 6, or Internet E-commerce terminal public kiosk or at another home).

User interaction may include requesting an item to be delivered by mail (e.g., information, data sheet, sample, etc.,). User interaction also may also be performed to play a game. It can also include receiving credit for winning a game (e.g., for guessing the six or eight ads selected for the user in an ad icon top-level page). SC application can ensure that game-results information is on the SC by a certain time (via SC timestamp), and that the entry fee is paid by SC account debit.

We claim:
1. An electronic purchase system comprising:
an interactive purchase television equipment connected to the electronic network;
a fixed intelligent data carrier medium connected to said interactive purchaser television equipment, the fixed intelligent data carrier medium comprising a first processor that is programmed to authenticate and decrypt services, the services include receiving incentives from an incentives provider;
a detachable intelligent data carrier medium connectable to said interactive purchaser television equipment, such that when the detachable intelligent carrier medium is mated to the interactive purchaser television equipment, the detachable intelligent data carrier medium is further programmed to communicate with the interactive purchaser television equipment;
the detachable intelligent data carrier medium comprising a second processor that is programmed to store accrued incentives received from the incentives provider in a memory equipment on the detachable intelligent data carrier medium;
the detachable intelligent carrier medium is programmed to process the accrued incentives, wherein a first signature validates the accrued incentives and a second signature validates the use of the accrued incentives;
a merchant terminal connected to the electronic network is programmed to read the accrued incentives stored on the detachable intelligent data carrier medium, to redeem a discount or a value corresponding to the read accrued incentives, apply the discount or value to a purchase transaction and store purchase information related to the purchase transaction onto the detachable intelligent data carrier medium;

the interactive purchase television equipment is programmed to read the purchase information stored on the detachable data carrier medium when said detachable data carrier medium is mated with the interactive purchase television equipment; and in response to reading the stored purchase information, the interactive purchase television equipment is further programmed to store onto the detachable data carrier medium further incentives based on the read purchase information.

2. A non-transitory computer-readable medium having programming instructions for performing a method of transacting a purchase between a purchaser and a merchant, comprising:

authenticating a service provided to an interactive television equipment using a fixed intelligent data carrier medium, the fixed intelligent data carrier medium comprising a first processor for service authentication and decryption, the service includes receiving incentives from an incentives provider;

storing accrued incentives onto a detachable intelligent data carrier medium via the interactive television equipment without requiring user interaction to activate storage to the intelligent data carrier medium, such that when the detachable intelligent data carrier medium is mated to the interactive purchaser television equipment, the detachable intelligent data carrier medium communicates with the interactive purchaser television equipment, the detachable intelligent data carrier medium comprising a second processor that processes the accrued incentives; and redeeming, at a merchant terminal, a discount or a value corresponding to the accrued incentives stored on the detachable data carrier medium when a purchase is made, wherein a first signature validates the accrued incentives and a second signature validates the user of the accrued incentives;

in response to redeeming the discount or value, storing by the merchant terminal onto the detachable data carrier medium, a purchase information related to the purchase;

detecting by the interactive television equipment that the detachable data carrier medium is mated to the interactive television equipment;

in response to detecting that the detachable data carrier medium is mated to the interactive television equipment, the interactive television equipment reading the purchase information stored on the detachable data carrier medium; and storing by the interactive television equipment onto the detachable data carrier medium further incentives based on the read purchase information.

3. The electronic purchase system according to claim 1, wherein the fixed intelligent data carrier medium comprises a fixed smart card, and wherein the detachable intelligent data carrier medium comprises a detachable smart card.

4. The electronic purchase system according to claim 1, wherein the first processor of the fixed intelligent data carrier medium is programmed by program instructions for service authentication and decryption, and wherein the second processor of the detachable intelligent data carrier medium is programmed by program instructions for storing accrued incentives and for generating a user's digital signature.

5. The electronic purchase system according to claim 1, wherein the first processor the fixed intelligent data carrier medium comprising a circuit programmed for service authentication and decryption, and wherein the second processor of the detachable intelligent data carrier medium comprises a circuit programmed to store accrued incentives and for generating a user's digital signature.

6. The computer readable medium according to claim 2, wherein the fixed intelligent data carrier medium comprises a fixed smart card, and wherein the detachable data carrier medium comprises a detachable smart card.

7. The computer readable medium according to claim 2, wherein the second processor of the detachable intelligent data carrier medium is further programmed to generate a user's digital signature and to receive purchase information when the purchase is made.

8. The computer readable medium according to claim 2, wherein the first processor of the fixed intelligent data carrier medium is programmed by program instructions for service authentication and decryption, and wherein the second processor of the detachable intelligent data carrier medium is programmed by program instructions for storing accrued incentives and for generating a user's digital signature.

9. The computer readable medium according to claim 2, wherein the first processor of the fixed intelligent data carrier medium comprises a circuit programmed for service authentication and decryption, and wherein the processor of the detachable intelligent data carrier medium comprises a circuit programmed for storing accrued incentives and for generating a user's digital signature.

10. The electronic purchase system according to claim 1, wherein the second signature validates the use of the accrued incentives during collection and refund stages.

11. The electronic purchase system according to claim 1, wherein the first signature is received from a publisher of the accrued incentives.

12. The electronic purchase system according to claim 1, wherein the interactive purchaser television equipment is one of a set top box (STB) and a digital television (DTV).

13. The electronic purchase system according to claim 1, wherein an electrical interconnection is formed between the intelligent data carrier medium and the interactive purchaser television equipment.

14. The electronic purchase system according to claim 1, wherein the intelligent data carrier medium communicates with the interactive purchaser television equipment via electrical signals.

15. The electronic purchase system according to claim 1, wherein the intelligent data carrier medium communicates with the interactive purchaser television equipment via electrical signals.

16. The electronic purchase system according to claim 1, wherein the incentives are accrued via impression.

17. The electronic purchase system according to claim 16, wherein the incentives are based on impression ads.

18. The electronic purchase system according to claim 16, wherein the incentives are based simple viewing.

* * * * *